(12) United States Patent
Aoki (10) Patent No.: US 10,518,782 B2
(45) Date of Patent: Dec. 31, 2019

(54) DRIVING CHARACTERISTICS ESTIMATING DEVICE AND DRIVE ASSISTING SYSTEM

(75) Inventor: Hirofumi Aoki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1215 days.

(21) Appl. No.: 14/405,537

(22) PCT Filed: Jun. 5, 2012

(86) PCT No.: PCT/JP2012/064470
§ 371 (c)(1),
(2), (4) Date: Dec. 4, 2014

(87) PCT Pub. No.: WO2013/183117
PCT Pub. Date: Dec. 12, 2013

(65) Prior Publication Data
US 2015/0183441 A1   Jul. 2, 2015

(51) Int. Cl.
*B60W 40/09* (2012.01)

(52) U.S. Cl.
CPC ......... *B60W 40/09* (2013.01); *B60W 2540/12* (2013.01); *B60W 2540/30* (2013.01)

(58) Field of Classification Search
CPC ....... G09B 19/167; G06F 11/34; G06F 3/012; G06F 3/013; G06F 3/015; B60W 40/09; B60W 2540/12; B60W 2540/30
USPC .......................................................... 434/62
See application file for complete search history.

(56) References Cited

U.S. PATENT DOCUMENTS

| | | | |
|---|---|---|---|
| 2005/0131597 A1* | 6/2005 | Raz | G09B 19/167 701/29.1 |
| 2006/0011399 A1* | 1/2006 | Brockway | A61B 5/18 180/272 |
| 2009/0237226 A1* | 9/2009 | Okita | B60W 10/184 340/435 |

(Continued)

FOREIGN PATENT DOCUMENTS

| | | |
|---|---|---|
| JP | 59 105587 | 6/1984 |
| JP | 2011 6038 | 1/2011 |
| JP | 2012 8696 | 1/2012 |

OTHER PUBLICATIONS

International Search Report dated Jul. 17, 2012 in PCT/JP12/064470 Filed Jun. 5, 2012.

*Primary Examiner* — Xuan M Thai
*Assistant Examiner* — Sadaruz Zaman
(74) *Attorney, Agent, or Firm* — Oblon, McClelland, Maier & Neustadt, L.L.P.

(57) ABSTRACT

To provide an operation start index value calculating unit for calculating index values of operation start times according to operation contents of a driver who drives a vehicle, and a driving characteristics estimating unit for determining ratios of probability densities to total value thereof in respective probability density functions in the calculated index values, based on the respective probability density functions of every state of the operation start times to the index values of the operation start times and on the index values of the operation start times calculated by the operation start index value calculating unit, and for estimating the driving characteristics of the driver by weighting the ratios to the total values of the respective probability densities.

16 Claims, 7 Drawing Sheets

(56) References Cited

U.S. PATENT DOCUMENTS

| | | | |
|---|---|---|---|
| 2010/0209887 A1* | 8/2010 | Chin | B60W 40/09 |
| | | | 434/65 |
| 2010/0219985 A1* | 9/2010 | Schofield | B60C 23/0401 |
| | | | 340/932.2 |
| 2012/0116665 A1 | 5/2012 | Aoki et al. | |

* cited by examiner

| | COUNTRY A | | COUNTRY B | |
|---|---|---|---|---|
| | NUMBER OF TIMES OF UNNECESSARILY ISSUED WARNINGS (NUMBER OF TIMES/ PREDETERMINED TRAVEL DISTANCE) | FREQUENCY OF UNNECESSARILY ISSUED WARNINGS (TRAVEL DISTANCE/NUMBER OF TIMES) | NUMBER OF TIMES OF UNNECESSARILY ISSUED WARNINGS (NUMBER OF TIMES/ PREDETERMINED TRAVEL DISTANCE) | FREQUENCY OF UNNECESSARILY ISSUED WARNINGS (TRAVEL DISTANCE/NUMBER OF TIMES) |
| WHEN ESTIMATION STUDY IS CARRIED OUT | 7 | 1661 | 2 | 1726 |
| INTER-VEHICLE DISTANCE TENDENCY: LONGER (FIXED) | 783 | 15 | 28 | 123 |
| INTER-VEHICLE DISTANCE TENDENCY: ORDINARY (FIXED) | 27 | 431 | 1 | 3452 |
| INTER-VEHICLE DISTANCE TENDENCY: SHORTER (FIXED) | 5 | 2325 | 0 | NO WARNING |
| INTER-VEHICLE DISTANCE TENDENCY: PREDETERMINED RATIO | 255 | 46 | 9 | 371 |

FIG.10

| | RESULT OF ESTIMATION OF INTER-VEHICLE DISTANCE TENDENCY LONGER | FREQUENCY OF UNNECESSARILY ISSUED WARNINGS (TRAVEL DISTANCE/NUMBER OF TIMES) | |
|---|---|---|---|
| | | RESULT OF ESTIMATION OF INTER-VEHICLE DISTANCE TENDENCY ORDINARY | RESULT OF ESTIMATION OF INTER-VEHICLE DISTANCE TENDENCY SHORTER |
| COUNTRY A | 1273 | 1341 | 0 TIME (TRAVEL OF 2376 KM) |
| COUNTRY B | 968 | 2124 | 0 TIME (TRAVEL OF 359 KM) |

DRIVING CHARACTERISTICS ESTIMATING DEVICE AND DRIVE ASSISTING SYSTEM

FIELD

The present invention relates to a driving characteristics estimating device for estimating driving characteristics of a driver and to a drive assisting system for carrying out a drive assisting according to the driving characteristics.

BACKGROUND

Conventionally, there is known a drive assisting system for carrying out a drive assisting according to driving characteristics of a driver who drives a vehicle. For example, Patent Literature 1 described below discloses a device for warning a driver of a driver's own vehicle to carry out a brake operation to prevent a collision with a target such as a preceding vehicle from back and a technology for adjusting timing of issue of a rear end collision warning, i.e. a relative distance (warning distance) to the target to which the rear end collision warning is issued. The warning distance is adjusted based on a speed of a driver's own vehicle at the time of brake operation of the driver to the target and on a relative speed of the target to the driver's own vehicle.

Note that, Patent Literature 2 described below discloses a technology for calculating a perceived relative distance between a driver's own vehicle and a perceived target based on an actual relative distance between the driver's own vehicle and the perceived target, a technology for calculating a perceived relative speed between the driver's own vehicle and the perceived target based on an actual relative speed between the driver's own vehicle and the perceived target, and a technology for calculating a ratio (perceived relative ratio) between the perceived relative distance and the perceived relative speed and carrying out a vehicle control when the perceived relative ratio exceeds a threshold value. The perceived target is an object recognized by the perception of a driver in driving operation. The perceived relative distance is a relative distance to a perceived target recognized by the driver. The perceived relative speed is a relative speed to the perceived target recognized by the driver. Further, Patent Literature 3 described below discloses a technology that a history of brake operation timings and steering operation timings by a driver when a relative distance between a driver's own vehicle and a preceding vehicle has become a predetermined distance are stored and average values of the respective timings are calculated, when a relative speed to the preceding vehicle is equal to or less than a predetermined value, a warning is issued by comparing an actual numerical value of the driver as to the brake operation timing with the average values, and when the relative speed to the preceding vehicle is larger than the predetermined value, a warning is issued by comparing an actual numerical value of the driver as to the steering operation timing with the average values.

CITATION LIST

Patent Literature

Patent Literature 1: Japanese Patent Application Laid-open No. S59-105587
Patent Literature 2: Japanese Patent Application Laid-open No. 2011-006038
Patent Literature 3: Japanese Patent Application Laid-open No. 2012-008696

SUMMARY

Technical Problem

Incidentally, in conventional drive assisting systems, there is a fear that timing of issue of a rear end collision warning is deviated from the timing desired by a driver depending on the states of a target and a driver's own vehicle and on the peripheral environment of the driver's own vehicle. Because of the reason, conventionally, a driver whose brake timing is earlier feels that issuing of the rear end collision warning is late and a driver whose brake timing is later feels that issuing of the rear end collision warning is early.

Accordingly, an object of the present invention is to improve the disadvantage of the conventional examples and to provide a driving characteristics estimating device and a drive assisting system capable of accurately estimating driving characteristics of a driver.

Solution to Problem

In order to achieve the above mentioned object, a driving characteristics estimating device according to the present invention includes an operation start index value calculating unit configured to calculate index values of operation start times according to operation contents of a driver who drives a vehicle; and a driving characteristics estimating unit configured to determine ratios of probability densities to total value thereof in respective probability density functions in the calculated index values, based on the respective probability density functions of every state of the operation start times to the index values of the operation start times and on the index values of the operation start times calculated by the operation start index value calculating unit, and configured to estimate the driving characteristics of the driver by weighting the ratios to the total values of the respective probability densities.

Further, in order to achieve the above mentioned object, a drive assisting system according to the present invention includes an operation start index value calculating unit configured to calculate index values of operation start times according to operation contents of a driver who drives a vehicle; a driving characteristics estimating unit configured to determine ratios of probability densities to total value thereof in respective probability density functions in the calculated index values, based on the respective probability density functions of every state of the operation start times to the index values of the operation start times and on the index values of the operation start times calculated by the operation start index value calculating unit, and configured to estimate the driving characteristics of the driver by weighting the ratios to the total values of the respective probability densities; and a drive assisting controller configured to carry out a drive assisting according to the estimated driving characteristics.

Here, it is desirable to further includes a probability density function calculating unit configured to divide frequency distributions of the operation start times to the index values of the obtained plural operation start times for every state of the plural operation start times by the driver, and configured to calculate the probability density functions of every state of the operation start times to the index values of the operation start times for the every frequency distributions, respectively.

Here, it is desirable that the operation start index value calculating unit calculates index values of brake operation start times of the driver, and the driving characteristics estimating unit desirably determines ratios of probability densities to the total value thereof in respective probability density functions in the calculated index values, based on the respective probability density functions of every state of the brake operation start times to the index values of the brake operation start times and on the index values of the brake operation start times calculated by the operation start index value calculating unit, and estimates an inter-vehicle distance tendency to a preceding vehicle in the driver as the driving characteristics by weighting the ratios to the total values of the respective probability densities.

Here, it is desirable that the operation start index value calculating unit calculates index values of operation start times according to a plurality of operation contents of the driver, and the driving characteristics estimating unit desirably determines ratios of probability densities to total value thereof in respective probability density functions in the calculated index values, based on the respective probability density functions of every state of the operation start times to the index values of the operation start times and on the index values of the operation start times calculated by the operation start index value calculating unit for the every operation contents, and estimates an inter-vehicle distance tendency to a preceding vehicle in the driver as driving characteristics by weighting the ratios to the total values of the respective probability densities.

Advantageous Effects of Invention

Since the driving characteristics estimating device and the drive assisting system according to the present invention can accurately estimate the driving characteristics of the driver, the device and the system carry out the drive assisting with a high accuracy in conformity with the driving operation tendency of driver by carrying out the drive assisting according to the driving characteristics.

BRIEF DESCRIPTION OF DRAWINGS

FIG. 3-1 is a frequency distribution view when a brake operation start time is earlier.

FIG. 3-2 is a frequency distribution view when the brake operation start time is normal.

FIG. 3-3 is a frequency distribution view when the brake operation start time is later.

DESCRIPTION OF EMBODIMENTS

An embodiment of a driving characteristics estimating device and a drive assisting system according to the present invention will be explained in detail based on the drawings. Note that, the present invention is by no means limited by the embodiment.

[Embodiment]

The embodiment of the driving characteristics estimating device and the drive assisting system according to the present invention will be explained based on FIG. 1 to FIG. 10.

The driving characteristics estimating device estimates driving characteristics of a driver based on the information of a traveling state of a vehicle, the information of an operating state of the driver who drives the vehicle. The traveling state of the vehicle means, for example, an accelerated traveling state, a decelerated traveling state, a constant speed traveling state, a straight traveling state, a turning traveling state. The operating state of the driver means, for example, a brake operating state, an accelerator operating state, a steering operating state. The driving characteristics of the driver mean characteristics of a driving mode that depend on a taste of the driver and mean a magnitude of an inter-vehicle distance, which is convenient to the driver, to a preceding vehicle (hereinafter, called "inter-vehicle distance tendency"). Further, the drive assisting system assists the driver in driving operation of a driver's own vehicle. The exemplified drive assisting system has the driving characteristics estimating device and a drive assisting device and carries out a drive assisting based on the driving characteristics of the driver estimated by the driving characteristics estimating device. As the drive assisting control, there are, for example, a preceding vehicle follow traveling control, a collision avoidance assist control, a lane departure warning control (LDW: Lane Departure Warning), a lane keeping assist control (LKA: Lane Keeping Assist), a staggering warning (rambling/drowsy drive warning) control, a vehicle speed on curve warning control, a vehicle speed on curve deceleration control, a driver's rambling/drowsy driving estimation control, and a drive diagnosis, etc.

In the exemplification, the driving characteristics estimating device and the drive assisting system will be explained that are configured such that the inter-vehicle distance tendency of the driver is estimated based on a brake operation state, when the inter-vehicle distance to a preceding vehicle is reduced, a warning sound is issued in an inter-vehicle distance according to the inter-vehicle distance tendency and the driver is prompted to carry out a brake operation for avoiding collision with the preceding vehicle.

Figure 1:
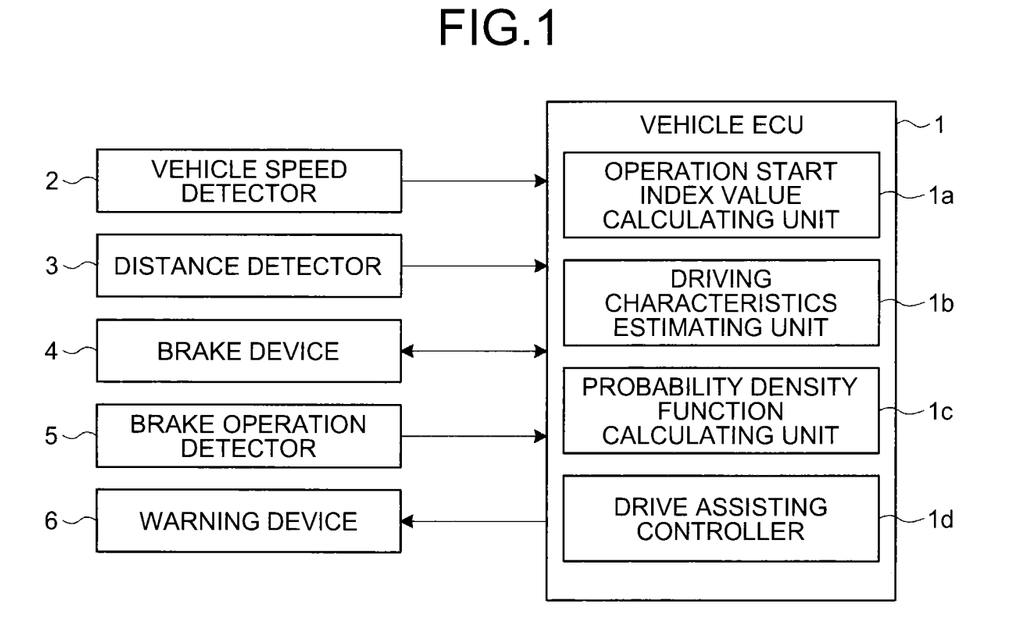
FIG. 1 is a block diagram illustrating a configuration of a driving characteristics estimating device and a drive assisting system according to the present invention.

An operation of the drive assisting system provided with the driving characteristics estimating device and the drive assisting device is controlled by an electronic control unit which carries out vehicle control (hereinafter, called "vehicle ECU") 1. As shown in FIG. 1, the vehicle ECU 1 is connected with a vehicle speed detector 2, a distance detector 3, a brake device 4, a brake operation detector 5, and a warning device 6.

The vehicle speed detector 2 is a vehicle speed sensor for detecting a vehicle speed Vs (m/s) of the driver's own vehicle. Preferably used as the vehicle speed detector 2 is, for example, a rotation angle sensor for detecting a rotation angle of an output shaft of a power transmission device such as a transmission, wheel speed sensors for detecting wheel speeds of respective wheels. A detection signal of the vehicle speed detector 2 is output to the vehicle ECU 1. The vehicle ECU 1 calculates the vehicle speed Vs of the driver's own vehicle based on the detection signal.

The distance detector 3 is a distance sensor for detecting an actual relative distance (hereinafter, called "actual relative distance") Dr (m) between the driver's own vehicle and a target forward of the vehicle (preceding vehicle). Preferably used as the distance detector 3 is a millimeter wave radar. The millimeter wave radar is attached to, for example, a central portion of a front surface (in a front grill, etc.) of the driver's own vehicle. The millimeter wave radar emits a millimeter wave within a predetermined range forward of the driver's own vehicle and receives a millimeter wave reflected by the target existing forward of the driver's own vehicle. The millimeter wave radar detects an actual relative distance Dr by measuring a time from the emission to the reception of the millimeter wave and calculating a distance from the driver's own vehicle (millimeter wave radar disposing position) to the target forward of the vehicle. Further, the millimeter wave radar can also detect an actual relative speed between the driver's own vehicle and the target (preceding vehicle) forward of the vehicle (hereinafter, called "actual relative speed") Vr. The millimeter wave radar detects the actual relative speed Vr by calculating a speed difference between the vehicle speed Vs of the driver's own vehicle and a speed of the forward target (a vehicle speed of the preceding vehicle) using the Doppler effect. The millimeter wave radar outputs the actual relative distance Dr and the actual relative speed Vr that have been detected to the vehicle ECU 1.

Further, a radar device using laser and infrared rays an image pick up device such as a CCD (charge coupled device) camera may be used as the distance detector 3. For example, the vehicle ECU 1 in the case carries out image processing of the image data picked up by the image pick device forward thereof and calculates the actual relative distance Dr. Further, when the distance detector 3 cannot directly detect the actual relative speed Vr, the vehicle ECU 1 may calculate the actual relative speed Vr based on, for example, a change of the actual relative distance Dr that changes as a time passes.

The brake device 4 generates a brake force to respective wheels by a brake depressing operation of the driver and generates the brake force to the wheel to be controlled in the respective wheels in response to a command of the vehicle ECU 1. The brake device 4 includes an actuator capable of controlling hydraulic pressure supplied to a brake unit (caliper, etc.) for every wheel. The actuator can output master cylinder pressure according to the operation amount of a brake pedal depressed by the driver as it is and can also output the master cylinder pressure after the actuator has increased or reduced the master cylinder pressure in response to a command of the vehicle ECU 1.

The brake operation detector 5 detects the brake depressing operation of the driver. For example, used as the brake operation detector 5 is an input switch of a stop lamp (so-called stop lamp switch) that is operated in association with the brake depressing operation of the driver. The stop lamp switch turns on the stop lamp in association with the brake depressing operation of the driver and outputs an on signal to the vehicle ECU 1. Accordingly, the vehicle ECU 1 can detect the brake depressing operation of the driver by the on signal. Further, a sensor for detecting an operation amount of the brake pedal depressed by the driver (a depress operation amount such as a pedal opening degree and a pedal operation speed) may be used as the brake operation detector 5.

The warning device 6 issues a warning to the driver by stimulating a sense of hearing and a sense of sight of the driver. For example, a sound generator for transmitting a warning to a driver by sound is available as the warning device 6. A warning sound such as a beep and audio information of warning contents to be issued are contemplated as the sound to be issued. Further, the warning device 6 may transmit the warning to the driver by displaying a warning on a display device such as a monitor. Contemplated as the display contents is a blink display, a turn-on display, and character information of warning contents.

The driving characteristics estimating device calculates index values of operation start times according to the operation contents of a driver who drives a vehicle. The driving characteristics estimating device determines ratios of probability densities to the total values thereof in respective probability density functions in the calculated index values based on the respective probability density functions of every state of the operation start times to the index values of the brake operation start times and on the calculated index values of the operation start times and estimates the driving characteristics of the driver by weighting the ratios to the total values of the respective probability densities. The vehicle ECU 1 is provided with an operation start index value calculating unit 1a for calculating the index values of the operation start times and a driving characteristics estimating unit 1b for estimating the driving characteristics of the driver.

In the exemplification, the driving characteristics estimating device calculates index values of brake depressing operation start times in a brake depressing operation of the driver (hereinafter, called also "brake operation start time"). Further, in the exemplification, the driving characteristics estimating device determines ratios of probability densities to the total values thereof in respective probability density functions in the calculated index values based on the respective probability density functions of every state (earlier, later, etc.) of the brake operation start times to the index values of the brake operation start times and on the calculated index values of the brake operation start times and estimates the driving characteristics of the driver by weighting the ratios to the total values of the respective probability densities.

The operation start index value calculating unit 1a calculates the index value PRE (BRK) of the brake operation start time based on Expression 1 shown below.

$$PRE(BRE) = \frac{\alpha * Vs - Vr - \beta * Ax}{Dr^n} \quad (1)$$

A denominator of Expression 1 means a relative distance (perceived relative distance) to the target (preceding vehicle) recognized by a driver and is obtained by correcting the actual relative distance Dr based on a feeling (misunderstanding) of the driver. When the vehicle speed Vs of the driver's own vehicle is faster, the driver of the driver's own vehicle misunderstands that a relative speed is faster than the actual relative speed Vr. When, for example, the actual relative distance Dr is the same at the time the driver's own vehicle travels on an ordinary road at a medium/low speed and at the time the vehicle travels on a highway at a high speed, the driver misunderstands that the relative speed is faster when traveling on the highway than when traveling on the ordinary road. In contrast, a numerator means a relative speed (perceived relative speed) to the target (the preceding vehicle) recognized by the driver and is obtained by correcting the actual relative speed Vr based on the feeling (misunderstanding) of the driver. When the actual relative distance Dr is farther, the driver of the driver's own vehicle misunderstands that the relative distance is nearer than the actual relative distance Dr. When, for example, the driver looks at electric poles disposed side by side at equal intervals in a traveling direction of the driver's own vehicle, since the driver feels that the intervals of the electric poles are narrower when the electric poles are disposed far away, the driver misunderstands that the position of an electric pole located far away is located nearer than an actual position. Namely, Expression 1 uses a brake operation start time estimation model as a model which is shown by a ratio of the perceived relative distance and the perceived relative speed.

As described above, "Vs", "Vr", and "Dr" show the vehicle speed, the actual relative speed, and the actual relative distance of the driver's own vehicle, respectively. "Ax" shows actual relative acceleration between the driver's own vehicle and the preceding vehicle (hereinafter, called "actual relative acceleration"). The actual relative speed Vr and the actual relative acceleration Ax are set to positive when the driver's own vehicle is away from the preceding vehicle. Further, "α", "β", and "n" are parameters determined by adaptation. For example, "α" is set within a range from 0 to 1 ($0<\alpha<1$). "β" is set within a range from 0 to 3 ($0<\beta<3$). "n" is set within a range from 0 to 1 ($0<n<1$).

The index value PRE (BRK) of the brake operation start time is set to a smaller numerical value as the driver's own vehicle is more away from the preceding vehicle. Namely, the index value PRE (BRK) shows that when its numerical value is set smaller, the brake operation start time becomes earlier. In contrast, when the driver's own vehicle more approaches the preceding vehicle, the numerical value of the index value PRE (BRK) increases. Namely, the index value PRE (BRK) shows that when its numerical value is set larger, the brake operation start time becomes later.

The driving characteristics estimating unit 1b estimates the driving characteristics of the driver when the index value PRE (BRK) has been calculated based on the index value PRE (BRK) of the brake operation start time calculated by the operation start index value calculating unit 1a and on the respective probability density functions of every state of the brake operation start time to the index value PRE (BRK) of the brake operation start time.

As to the respective probability density functions of the every state of the brake operation start time to the index value PRE (BRK) of the brake operation start time, it may, for example, analyze the travel data of plural drivers in plural travel patterns and previously prepare the travel data as a map. The respective probability density functions of the every state may be obtained by updating a map registered first by the travel of the driver. Because of the reason, the vehicle ECU 1 is provided with a probability density function calculating unit 1c for calculating and updating the respective probability density functions of the every state. The probability density function calculating unit 1c divides frequency distributions of the operation start times to the index values of the plural obtained operation start times for every state of the plural operation start times by the driver and calculates the probability density functions of every state of the operation start times to the index values of the operation start times for the every frequency distributions, respectively. In the exemplification, the probability density function calculating unit 1c divides the frequency distributions of the brake operation start times to the obtained index values PRE (BRK) of the plural brake operation start times of the driver for every state (earlier, later, etc.) of the plural brake operation start times by the driver and calculates the probability density functions of every state of the brake operation start times to the index values PRE (BRK) of the brake operation start times, respectively for the every frequency distributions.

Figure 2:
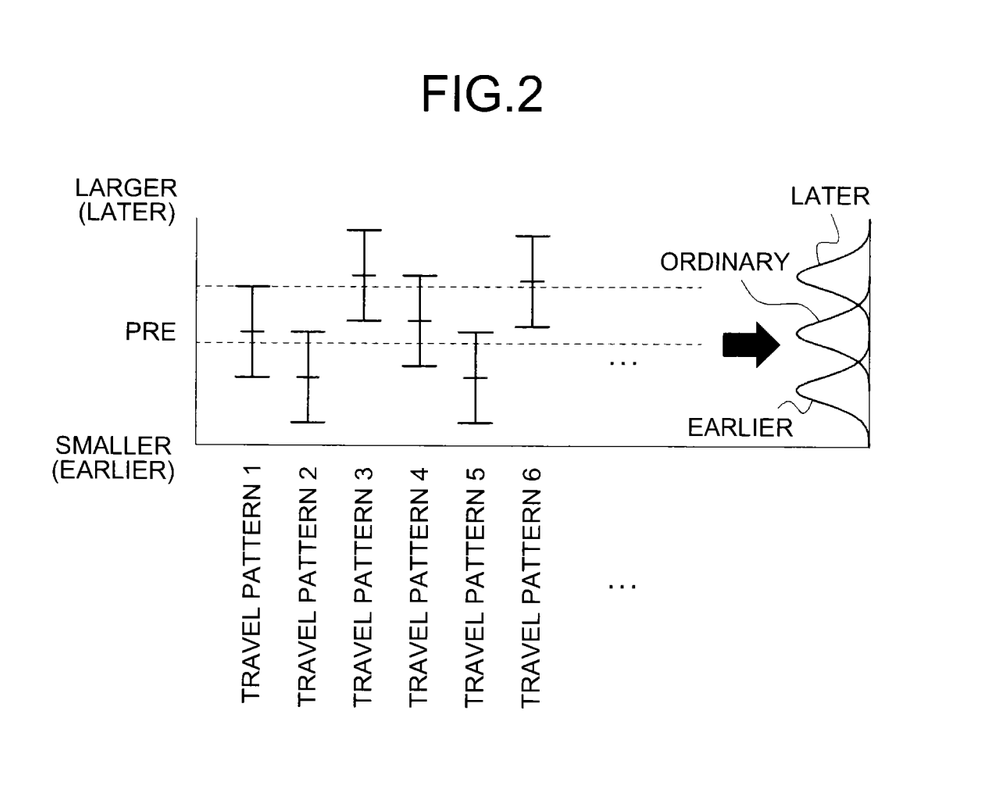
FIG. 2 is a view explaining a calculation process of an index value of a brake operation start time.

Specifically, as illustrated in, for example, a left view of FIG. 2, average values of the index values PRE (BRK) of the brake operation start times are determined for every travel data based on the obtained travel data, and the respective average values are classified for the every state of the brake operation start times. Here, the average values are classified to three groups, i.e. a group having an earlier brake operation start time, a group having an ordinary brake operation start time, and a group having a later brake operation start time. Note that, the state that the brake operation start time is in the ordinary state means a state that when, for example, an average value of inter-vehicle distances to a preceding vehicle in which many drivers carry out a brake depressing operation is used as a reference inter-vehicle distance, the brake depressing operation is started in the reference inter-vehicle distance. Based on the state described above, the state that the brake operation start time is in the earlier state means a state that the brake operation start time is earlier than the ordinary state, i.e. a state that the brake depressing operation is started when the inter-vehicle distance between the driver's own vehicle and the preceding vehicle is larger than the reference inter-vehicle. Further, the state that the brake operation start time is in the late state means a state that the brake operation start time is later than the ordinary state, i.e. a state that the brake depressing operation is started when the inter-vehicle distance between the driver's own vehicle and the preceding vehicle is smaller than the reference inter-vehicle distance.

Figure 4:
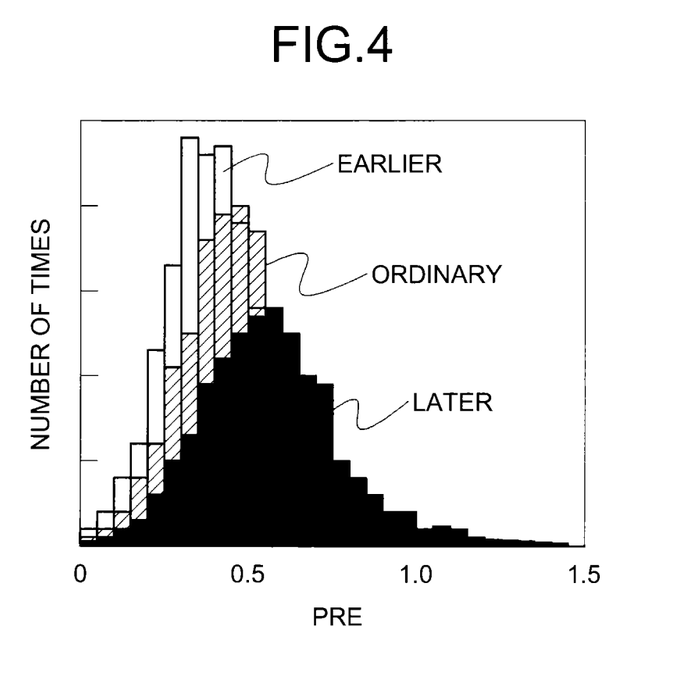
FIG. 4 is a view in which the frequency distributions from FIG. 3-1 to FIG. 3-3 are illustrated together.

As illustrated on a right side of FIG. 2, the probability density function calculating unit 1c makes a frequency distribution map of the respective groups. FIG. 3-1 to FIG. 3-3 are frequency distribution maps of the respective groups, respectively. FIG. 4 is a view illustrating the frequency distributions of the respective groups together. In FIG. 3-1 to FIG. 4, a horizontal axis shows the index value PRE (BRK) of the brake operation start time, and a vertical axis shows the number of times the brake depressing operation is detected.

Figure 5:
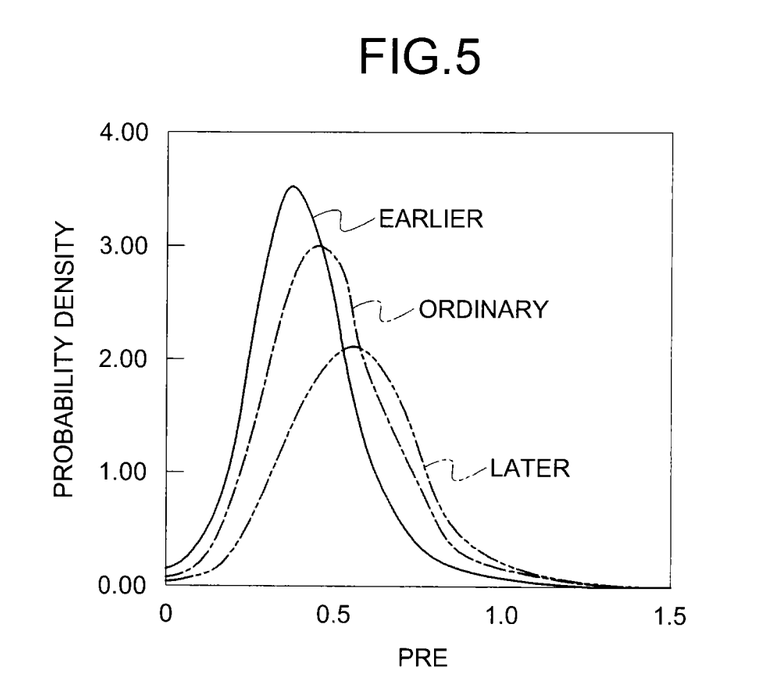
FIG. 5 is a view illustrating the frequency distributions of FIG. 4 in the form of a probability density function of a normal distribution.

The probability density function calculating unit 1c calculates probability density functions of the every state from the frequency distribution (FIG. 4) of the every state of the brake operation start times, respectively. Specifically, the probability density function calculating unit 1c calculates the probability density functions of every state of the brake operation start times to the index values PRE (BRK) of the brake operation start times, respectively for the every frequency distributions (normal distributions). Namely, as illustrated in FIG. 5, the frequency distributions (normal distributions) of the respective groups are shown in the form of the probability density function of the normal distribution. A storage device stores the respective probability density functions as a map. In FIG. 5, a horizontal axis shows the index value PRE (BRK) of the brake operation start time, and a vertical axis shows the probability density.

Note that, the probability density function of the normal distribution is as shown in Expression 2 described below. A symbol "σ" represents a standard deviation of the probability density function, "σ²" represents a dispersion of the probability density function, and "μ" represents an average of the probability density function.

$$f(x) = \frac{1}{\sqrt{2\pi}\,\sigma} \exp\left(-\frac{(x-\mu)^2}{2\sigma^2}\right) \quad (2)$$

In the exemplification, although the map of the probability density function is stored in the storage device of the vehicle, the map may be stored in a storage device such as a server outside of the vehicle in addition to the storage device inside of the vehicle. In the case, it is preferable to synchronize the maps of the respective storage devices inside and outside of the vehicle with a most recent map using a mobile phone and a communication device mounted on the vehicle. The synchronization may be carried out in response to a command of the driver or may be carried out when the map is updated by a travel. As a specific example, a cloud computing technology can be used. For example, the information of the map stored in the storage device outside the vehicle may be applied only to the driver or can be also used as a database for making statistics of the driving characteristics of various drivers. In the former case, the information of the driving characteristics of the driver can be used instantly even in a different vehicle even if the driver replaces the vehicle or uses a different vehicle by rental in addition to only the vehicle to which the map is made by reading the most recent map of the driver from the outside-of-vehicle storage device via communication. Further, in the latter case, since the number of drivers and travel patterns for making the database increases, for example, an accuracy of the information of the map registered to the vehicle first can be increased.

Figure 6:
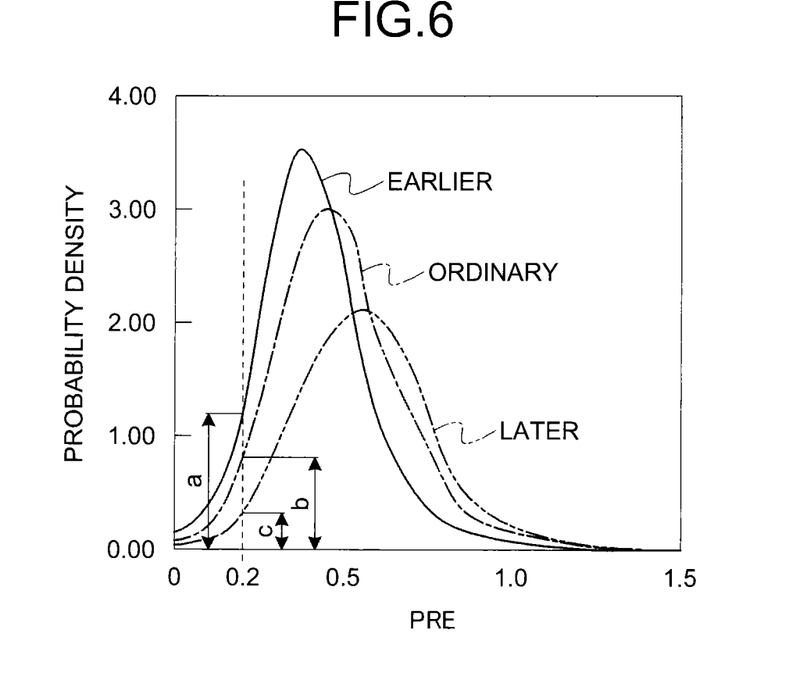
FIG. 6 is a view explaining respective probability densities to an index value of a certain brake operation start time.

The driving characteristics estimating unit 1b reads the numerical values of the probability density functions of every states of the brake operation start times corresponding to the index values PRE (BRK) of the brake operation start times calculated by the operation start index value calculating unit 1a from the map. For example, FIG. 6 illustrates numerical values a, b, c in the respective states of the brake operation start time when the index value PRE (BRK) is 0.2. The numerical value a represents the probability density when the brake operation start time is in the earlier state. The numerical value b represents the probability density when the brake operation start time is in the ordinary state. The numerical value a represents the probability density when the brake operation start time is in the earlier state. The numerical value b represents the probability density when the brake operation start time is in the ordinary state. The numerical value c represents the probability density when the brake operation start time is in the later state. In the exemplification of FIG. 6, "a=1.21", "b=0.80", and "0.38".

The driving characteristics estimating unit 1b calculates a total value of the respective numerical values a, b, c based thereon. The total value is a total value of probability densities a, b, c in the respective probability density functions in the calculated index values PRE (BRK) (probability density functions in the respective states of the brake operation start times). The driving characteristics estimating unit 1b determines a ratio (a/a +b+c) to the total value of the probability densities a, b, c when the brake operation start time is in the earlier state, a ratio (b/a+b+c) to the total value of the probability densities a, b, c when the brake operation start time is in the ordinary state, and a ratio (c/a+b+c) to the total value of the probability densities a, b, c when the brake operation start time is in the later state. The driving characteristics estimating unit 1b estimates the driving characteristics (inter-vehicle distance tendency) of the driver by weighting the respective ratios.

The weighted index value φ (B-on, PRE (BRK)) of the driving characteristics can be determined by Expression 3 shown below. Note that, it is shown that "B-on, PRE (BRK)" in parentheses are an index value φ of the driving characteristics (inter-vehicle distance tendency) when the brake operation starts and the index value PRE (BRK) of the brake operation start time is a certain numerical value (for example, 0.2 described above).

$$\varphi(B-\text{on}, PRE(BRK)) = \frac{p_1 * a + p_2 * b + p_3 * c}{a + b + c} \quad (3)$$

Signs "$p_1$", "$p_2$", and "$p_3$" show a weight coefficient when the brake operation start time is in the earlier state, a weight coefficient when the brake operation start time is in the ordinary state, and a weight coefficient when the brake operation start time is in the later state, respectively. The weight coefficients $p_1$, $p_2$ and $p_3$ may be a fixed value or may be a value that can be varied depending on a traveling state. In, for example, a crowded traffic state, a vehicle speed is slower than that in a non-crowded traffic state and the inter-vehicle distance to the preceding vehicle is reduced. Because of the reason, in the crowded traffic state, when the brake operation start time is in the earlier state, the weight (weight coefficient $p_1$) is reduced, whereas when the brake operation start time is in the later state, the weight (weight coefficient $p_3$) is increased. In contrast, in the non-crowded traffic state, when the brake operation start time is in the earlier state, the weight (weight coefficient $p_1$) is increased, whereas when the brake operation start time is in the later state, the weight (weight coefficient $p_3$) is reduced. Likewise the example, on the ordinary road, the vehicle speed is slower than that on the highway and the inter-vehicle distance to the preceding vehicle is also reduced. Because of the reason, on the ordinary road, when the brake operation start time is in the earlier state, the weight (weight coefficient $p_1$) is reduced, whereas when the brake operation start time is in the later state, the weight (weight coefficient $p_3$) is increased. In contrast, on the highway, when the brake operation start time is in the earlier state, the weight (weight coefficient $p_1$) is increased, whereas when brake operation start time is in the later state, the weight (weight coefficient $p_3$) is reduced.

Figure 7:
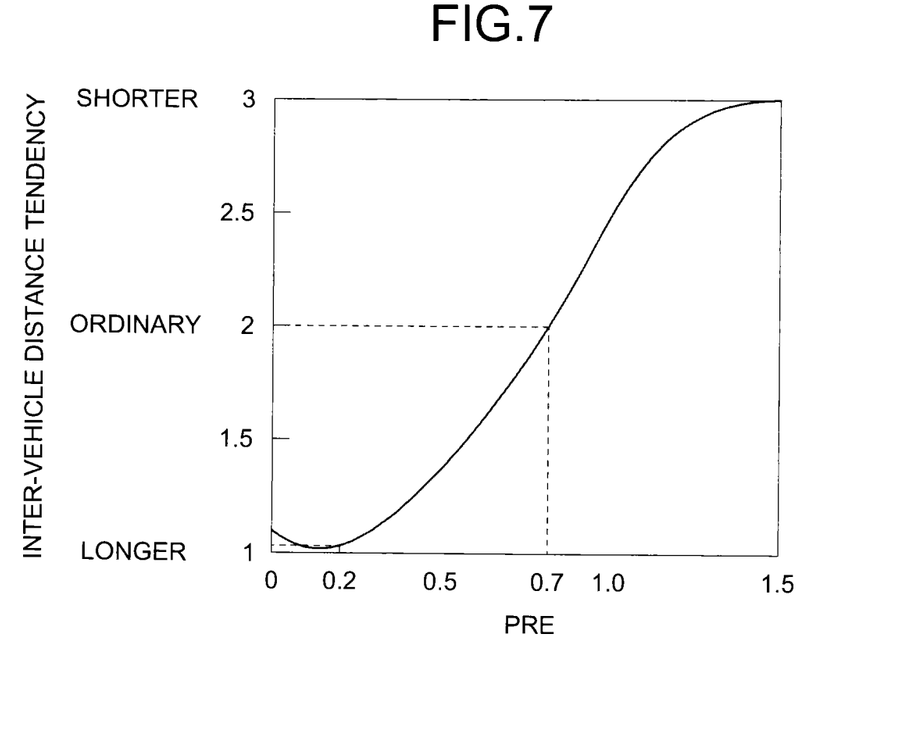
FIG. 7 is a view explaining an inter-vehicle distance tendency to the index value of the certain brake operation start time.

The driving characteristics estimating unit 1b estimates the driving characteristics (inter-vehicle distance tendency) of the driver based on the index value φ. The index value φ represents the driving characteristics (inter-vehicle distance tendency) stepwise or continuously depending on a magnitude of its numerical value. For example, in the exemplification, the inter-vehicle distance in which the brake depressing operation is started is set with three steps of the driving characteristics (inter-vehicle distance tendency) that are long, ordinary, and short. The exemplification shows such an inter-vehicle distance tendency that the index value φ, which is smaller than an index value φ0 when the brake depressing operation is started in an ordinary inter-vehicle distance, makes the inter-vehicle distance in which the brake depressing operation is started longer than the ordinary inter-vehicle distance and makes the brake operation start time earlier than an ordinary brake operation start time. Further, the exemplification shows such an inter-vehicle distance tendency that the index value φ which is larger than the index value φ0, makes the inter-vehicle distance in which the brake depressing operation is started shorter than the ordinary inter-vehicle distance and makes the brake operation start time later than the ordinary brake operation start time. FIG. 7 illustrates a result of arithmetic operation of the index value φ of every index value PRE (BRK) of the brake operation start times in FIG. 5 and FIG. 6. According to FIG. 7, it can be found that there is illustrated such an inter-vehicle distance tendency that when the index value PRE (BRK) is 0.2, the inter-vehicle distance in which the brake depressing operation is started is longer than an ordinary inter-vehicle distance and that the brake operation start time is earlier than an ordinary brake operation start time. Further, it can be found that there is illustrated such an inter-vehicle distance tendency that when the index value PRE (BRK) is 0.7, the inter-vehicle distance in which the brake depressing operation is started, i.e. the brake operation start time is ordinary.

FIG. 7 may replace the result of calculation of the index value φ with a one-dimensional scalar quantity (1, 2, 3, etc.) according to the respective states (earlier, ordinary, later) of the brake operation start time or to the respective states (longer, ordinary, shorter) of the inter-vehicle distance.

The vehicle ECU 1 is provided with a drive assisting controller 1d for carrying out a drive assisting control. The drive assisting controller 1d carries out the drive assisting control based on the driving characteristics (inter-vehicle distance tendency). When, for example, the inter-vehicle distance tendency shows that the driver will carry out the brake operation at the ordinary brake operation start time, the drive assisting controller 1d operates the warning device 6 when the driver's own vehicle has approached the preceding vehicle up to the reference inter-vehicle distance and alerts the attention of the driver. Further, when the inter-vehicle distance tendency shows that the driver will carry out the brake operation at the brake operation start time earlier than the ordinary brake operation start time, the drive assisting controller 1d operates the warning device 6 before the driver's own vehicle has approached the preceding vehicle up to the reference inter-vehicle distance and alerts the attention of the driver. In the case, for example, the index value φ that becomes smaller preferably causes the warning device 6 to be operated in a state that the driver's own vehicle has been more away from the preceding vehicle than the reference inter-vehicle distance. In contrast, when the inter-vehicle distance tendency shows that the driver will carry out the brake operation at the brake operation start time later than the ordinary brake operation start time, the drive assisting controller 1d operates the warning device 6 when the inter-vehicle distance between the driver's own vehicle and the preceding vehicle has become shorter than the reference inter-vehicle distance and alerts the attention of the driver. In the case, for example, the index value φ that becomes larger preferably causes the warning device 6 to be operated in a state that the driver's own vehicle has more approached the preceding vehicle than the reference inter-vehicle distance. However, when the driver's own vehicle has approached the preceding vehicle up to a predetermined inter-vehicle distance, the warning device 6 is preferably operated regardless of a magnitude the index value φ to avoid rear end collision.

The drive assisting controller 1d can carry out a drive assisting for operating the brake device 4 in place of the warning by the warning device 6 or together with the warning and for generating brake force to the respective wheels or increasingly assisting the brake force of the respective wheels by the brake operation of the driver.

As described above, since the driving characteristics estimating device and the drive assisting system of the embodiment can accurately estimate the driving characteristics of the driver that change depending on a travel environment and a feeling even in one traveling, an appropriate drive assisting can be carried out in conformity with the driving characteristics. For example, in the driving characteristics estimating device and the drive assisting system, since the drive assisting such as a warning are carried out in conformity with the inter-vehicle distance tendency to the preceding vehicle according to the tendency of the brake operation start time of the driver, an uncomfortable feeling that the intervention of warning are carried out earlier or later and a feeling of unnecessary of warning due to the intervention of warning that are carried out earlier to the driving characteristics of the driver are not given to the driver. Namely, according to the driving characteristics estimating device and the drive assisting system, even if an intervention time of warning are more advanced than an ordinary intervention time (at the time of ordinary control), when the driver has the inter-vehicle distance tendency in which the brake operation start time is earlier, the driver has no uncomfortable feeling to the intervention of warning. Further, in the drive assisting system, when the driving characteristics of the driver are estimated, since the vehicle speed Vs of the driver's own vehicle and the actual relative vehicle speed Vr are used and the acceleration/deceleration of the driver's own vehicle and the preceding vehicle are taken into consideration, the intervention time of warning can be made appropriate also in the point.

Note that, Expression 3 can be developed as shown by Expression 7 described below based on Expressions 4 to 6 described below in which Expression 2 is replaced to the respective states of the brake operation start time.

$$a = \frac{1}{\sqrt{2\pi}\,\sigma(a)} \exp\left(-\frac{(x-\mu(a))^2}{2\sigma(a)^2}\right) \quad (4)$$

$$b = \frac{1}{\sqrt{2\pi}\,\sigma(b)} \exp\left(-\frac{(x-\mu(b))^2}{2\sigma(b)^2}\right) \quad (5)$$

$$c = \frac{1}{\sqrt{2\pi}\,\sigma(c)} \exp\left(-\frac{(x-\mu(c))^2}{2\sigma(c)^2}\right) \quad (6)$$

-continued $$\varphi(B-on, PRE(BRK)) = \frac{\frac{p_1}{\sigma(a)}\exp\left(-\frac{(x-\mu(a))^2}{2\sigma(a)^2}\right)+\frac{p_2}{\sigma(b)}\exp\left(-\frac{(x-\mu(b))^2}{2\sigma(b)^2}\right)+\frac{p_3}{\sigma(c)}\exp\left(-\frac{(x-\mu(c))^2}{2\sigma(c)^2}\right)}{\frac{1}{\sigma(a)}\exp\left(-\frac{(x-\mu(a))^2}{2\sigma(a)^2}\right)+\frac{1}{\sigma(b)}\exp\left(-\frac{(x-\mu(b))^2}{2\sigma(b)^2}\right)+\frac{1}{\sigma(c)}\exp\left(-\frac{(x-\mu(c))^2}{2\sigma(c)^2}\right)} \quad (7)$$

Signs "σ (a)", "σ (b)", and "σ (c)" represent a dispersion when the brake operation start time is in the earlier state, a dispersion when the brake operation start time is in the ordinary state, and a dispersion when the brake operation start time is in the later state, respectively. Signs "μ (a)", "μ (b)", and "μ (c)" represent an average when the brake operation start time is in the earlier state, an average when the brake operation start time is in the ordinary state, and an average when the brake operation start time is in the later state.

Incidentally, although the embodiment is exemplified assuming that the warning sound is issued in the inter-vehicle distance according to the inter-vehicle distance tendency, the drive assisting system may carry out a deceleration control in the inter-vehicle distance according to inter-vehicle distance tendency. Further, the drive assisting system may carry out the issue of the warning sound and the deceleration control together. The deceleration control is a control for decelerating the vehicle from a state that the driver does not carry out the brake operation or a control for more decelerating the vehicle from a state that the driver carries out the brake operation.

Further, it can be said that the index value PRE (BRK) of the brake operation start time shows the driving characteristics of the driver. Accordingly, when, for example, the index value PRE (BRK) of the brake operation start time becomes large and exceeds a predetermined threshold value, the drive assisting device may carry out the drive assisting determining that the brake operation start time is later.

[Modification]

The driving characteristics estimating device and the drive assisting system of the embodiment described above use a parameter called the tendency of the brake operation start time to the preceding vehicle to estimate the driving characteristics (inter-vehicle distance tendency) of the driver. A driving characteristics estimating device and a drive assisting system of a modification estimate the driving characteristics (inter-vehicle distance tendency) based on a parameter of an operation tendency of the driver to the preceding vehicle, a parameter of a travel environment (a gradient of a travel path), and a parameter of a vehicle traveling state (vehicle lateral acceleration) other than the parameter described above in place of or together with the estimation of the driving characteristics (inter-vehicle distance tendency) based on the tendency of the brake operation start time.

For example, as the parameter of the operation tendency of the driver, there are contemplated a tendency of an accelerator-off operation start time to the preceding vehicle. The parameter is mainly used in an estimation study on an up-slope road and a highway. In the case, an index value PRE (ACC) of the accelerator-off operation start time of the driver is calculated. The index value PRE (ACC) can be determined by Expression similar to Expression 1 described above and calculated by replacing the respective parameters such as the vehicle speed Vs of the driver's own vehicle of Expression 1 with information at the time an accelerator-off operation starts. Further, in the case, probability density functions in the respective states (earlier, ordinary, later) of the accelerator-off operation start time are used. The respective probability density functions may be determined likewise the probability density functions illustrated in FIG. 5 described above.

Further, in the case, numerical values a, b, c of the probability density functions of the respective states of the accelerator-off operation start time corresponding to the index value PRE (ACC) calculated by an operation start index value calculating unit 1a are read based on the respective probability density functions and on the index value PRE (ACC). The driving characteristics estimating unit 1b determines a ratio (a/a+b+c) to the total value of the probability densities a, b, c when the accelerator-off operation start time is in an earlier state, a ratio (b/a+b+c) to the total value of the probability densities a, b, c when the accelerator-off operation start time is in an ordinary state, and a ratio (c/a+b+c) to the total value of the probability densities a, b, c when the accelerator-off operation start time is in a later state based on the respective numerical values a, b, c.

An index value φ (ACC-on, PRE (ACC)) of driving characteristics based on an accelerator-off operation is determined by Expression similar to Expression 3 described above. At the time, signs "$p_1$", "$p_2$", "$p_3$" become a weight coefficient when the accelerator-off operation start time is in the earlier state, a weight coefficient when the accelerator-off operation start time is in the ordinary state, and a weight coefficient when the accelerator-off operation start time is in the later state, respectively. As described above, the result of calculation of the index value φ is preferably replaced with a one-dimensional scalar quantity (1, 2, 3, etc.) according to the respective states (earlier, ordinary, later) of the accelerator-off operation start time or to the respective states (longer, ordinary, shorter) of the inter-vehicle distance. This is because that the result of estimation of the driving characteristics (inter-vehicle distance tendency) of the driver based on the accelerator-off operation can be treated similarly to the result of estimation of the driving characteristics (inter-vehicle distance tendency) of the driver based on the brake depressing operation.

Further, the driving characteristics estimating unit 1b may be caused to estimate the driving characteristics (inter-vehicle distance tendency) of the driver based on a parameter that is a tendency of an average inter-vehicle time when the driver follows the preceding vehicle by the driving of the driver (hereinafter, called "average inter-vehicle time at following time"). At the time, for example, when the following travel continues a predetermined distance or a predetermined time or more, the average inter-vehicle time at following time within the period is determined. Also in the case, the result of estimation is preferably replaced with a one-dimensional scalar quantity (1, 2, 3, etc.) according to the respective states (earlier, ordinary, later) of the inter-vehicle distance. The parameter is mainly used in the estimation study on the highway.

In the exemplifications, if no preceding vehicle exists, the driving characteristics (inter-vehicle distance tendency) of the driver cannot be estimated. Thus, a configuration is made so that the driving characteristics (inter-vehicle distance tendency) of the driver can be estimated even if no preceding vehicle exists. For example, a vehicle has such a tendency that when a brake depressing force is large, vehicle deceleration becomes large, and when the brake depressing force is small, the vehicle deceleration becomes small. A driver having a large brake depressing force has such a tendency that when, for example, the driver carries out a brake depressing operation to keep an inter-vehicle distance to a preceding vehicle, an inter-vehicle distance to the preceding vehicle becomes shorter than that of a driver having a small brake depressing force. Because of the reason, the driving characteristics estimating unit $1b$ may be caused to estimate the driving characteristics (inter-vehicle distance tendency) of the driver based on a parameter that is a tendency of average vehicle deceleration at the time of brake operation. Also in the case, the result of estimation is preferably replaced with the one-dimensional scalar quantity (1, 2, 3, etc.) according to the respective states (earlier, ordinary, later) of the inter-vehicle distance. Since the parameter can obtain more sampling data than the parameter shown previously, a frequency for carrying out the estimation study can be increased.

Figure 8:
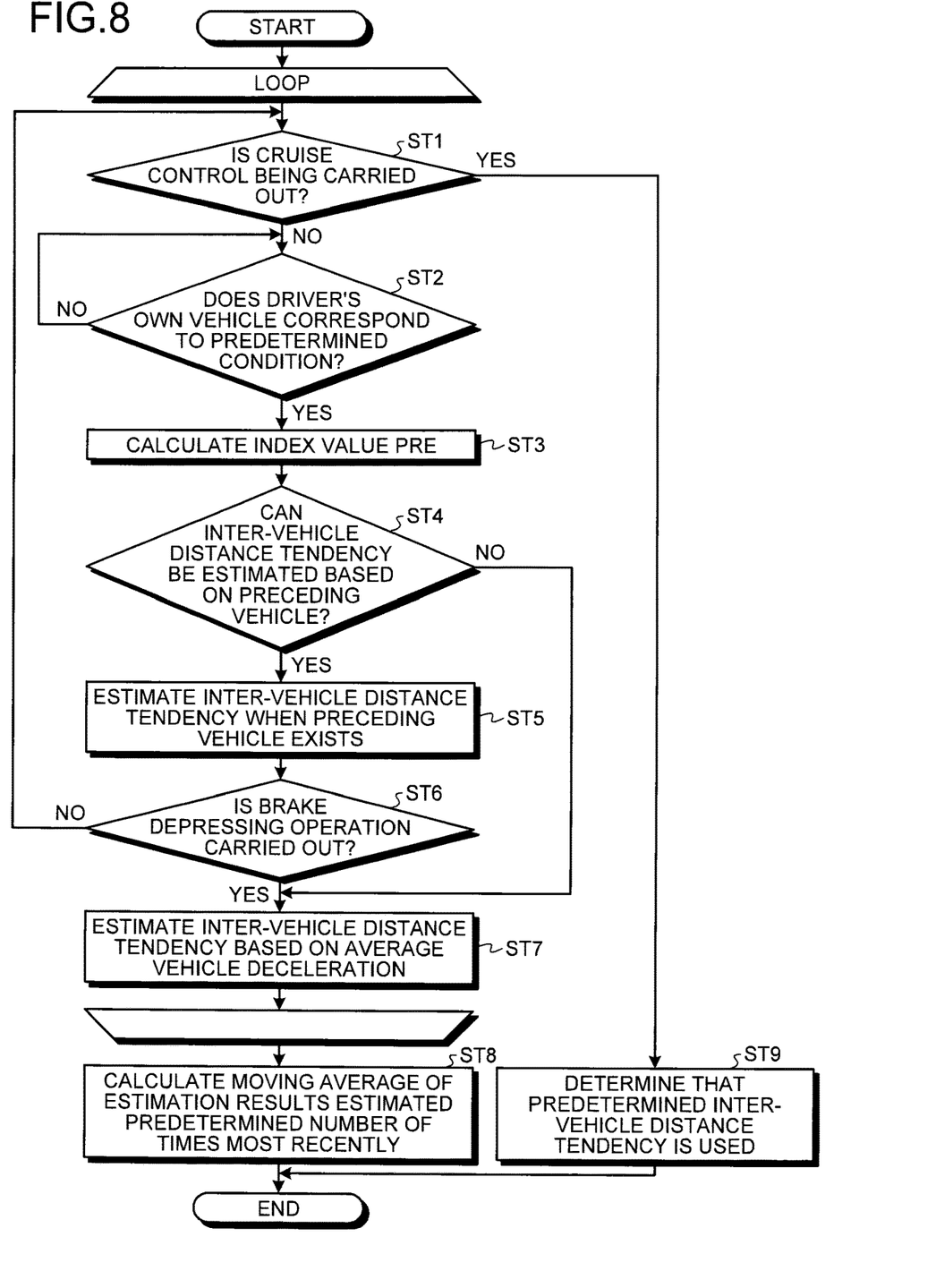
FIG. 8 is a flowchart explaining a driving characteristics estimation.

An operation of the driving characteristics estimating device and the drive assisting system will be explained based on a flowchart of FIG. 8.

In the driving characteristics estimating device and the drive assisting system, the operation start index value calculating unit $1a$ calculates index values of operation start times according to the plural operation contents (brake depressing operation and accelerator-off operation) of the driver. The driving characteristics estimating unit $1b$ determines ratios of probability densities to the total values thereof in respective probability density functions in the calculated index values based on the respective probability density functions of every state of the operation start times to the index values of the operation start times and on the index values of the operation start times calculated by the operation start index value calculating unit $1a$ for the every operation contents and estimates an inter-vehicle distance tendency to a preceding vehicle in the driver as the driving characteristics by weighting the ratios to the total values of the respective probability densities. When the driving characteristics according to a kind of operation contents are estimated a predetermined number of times, the driving characteristics estimating device and the drive assisting system determine a moving average thereof, determine that it is final driving characteristics of the driver, and study (update) the final determination as a result of the estimation study of the driving characteristics.

The vehicle ECU 1 determines whether or not the driver's own vehicle carries out a cruise control (step ST1). When the driver's own vehicle does not carry out the cruise control, the vehicle ECU 1 begins to estimate the driving characteristics (inter-vehicle distance tendency) of the driver of the driver's own vehicle.

First, the operation start index value calculating unit $1a$ determines whether or not the driver's own vehicle corresponds to a predetermined condition (step ST2). Corresponding to the predetermined condition means, for example, a time when the driver carries out the accelerator-off operation to keep the inter-vehicle distance to the preceding vehicle, a time when the driver carries out the brake depressing operation to keep the inter-vehicle distance to the preceding vehicle, a time when the driver follows the preceding vehicle by the driving of the driver, and a time when the vehicle deceleration is generated by the brake depressing operation of the driver although no preceding vehicle exists. When the driver's own vehicle does not correspond to the predetermined condition, the operation start index value calculating unit $1a$ repeats the determination at step ST2.

The operation start index value calculating unit $1a$ calculates the index value PRE (ACC) of the accelerator-off operation start time in the accelerator-off operation and calculates the index value PRE (BRK) of the brake operation start time in the brake depressing operation (step ST3). Note that, when the driver follows the preceding vehicle by the driving of the driver or when the vehicle deceleration is generated by the brake depressing operation of the driver although no preceding vehicle exists, step ST3 is not carried out and a process goes to next step ST4.

Next, the driving characteristics estimating unit $1b$ determines whether or not the estimation study of the driving characteristics (inter-vehicle distance tendency) using the existence of the preceding vehicle can be carried out (step ST4). Here, when the vehicle speed Vs of the driver's own vehicle is equal to or more than a predetermined vehicle speed and the inter-vehicle distance to the preceding vehicle is equal to or less than a predetermined distance, it is determined that the estimation study of the driving characteristics (inter-vehicle distance tendency) using the existence of the preceding vehicle can be carried out. The predetermined vehicle speed and the predetermined distance may be determined depending on, for example, whether or not the accelerator-off operation and the brake depressing operation of the driver become an operation affected by the preceding vehicle. For example, the predetermined vehicle speed is set to a slow speed. This is because when the vehicle speed Vs of the driver's own vehicle is lower than the slow speed, there is a high possibility that the accelerator-off operation has been carried out. The predetermined distance is set to a distance such as several hundred meters in which it cannot be said that the accelerator-off operation and the brake depressing operation are affected by the preceding vehicle.

When the driving characteristics estimating unit $1b$ determines that the estimation study of the driving characteristics (inter-vehicle distance tendency) can be carried out, the driving characteristics estimating unit $1b$ estimates the driving characteristics (inter-vehicle distance tendency) when the preceding vehicle exists (step ST5). At step ST5, when the driver carries out the accelerator-off operation to keep the inter-vehicle distance to the preceding vehicle, the driving characteristics estimating unit $1b$ estimates the driving characteristics (inter-vehicle distance tendency) of the driver based on the accelerator-off operation. When the driver carries out the brake depressing operation to keep the inter-vehicle distance to the preceding vehicle, the driving characteristics estimating unit $1b$ estimates the driving characteristics (inter-vehicle distance tendency) of the driver based on the brake depressing operation. Further, when the driver follows the preceding vehicle by the driving of the driver, the driving characteristics estimating unit $1b$ estimates the driving characteristics (inter-vehicle distance tendency) of the driver based on the tendency of the average inter-vehicle time at following time.

The driving characteristics estimating unit $1b$ determines whether or not the brake depressing operation has been carried out, i.e. whether or not the estimation has been carried out based on the brake depressing operation (step ST6).

When the brake depressing operation has been carried out, the driving characteristics estimating unit 1b estimates the driving characteristics (inter-vehicle distance tendency) of the driver based on the tendency of the average vehicle deceleration at the time of brake operation (step ST7). In contrast, when the brake depressing operation has not been carried out, the driving characteristics estimating unit 1b returns to step ST1.

Further, when it is determined at step ST4 that the estimation study of the driving characteristics (inter-vehicle distance tendency) using the existence of the preceding vehicle cannot be carried out, the driving characteristics estimating unit 1b goes to step ST7, estimates the driving characteristics (inter-vehicle distance tendency) of the driver based on the tendency of the average vehicle deceleration at the time of brake operation, i.e. estimates the driving characteristics (inter-vehicle distance tendency) when no preceding vehicle exists.

In the exemplification, step ST1 to step ST7 are repeated until at least one of the respective estimations {the estimation of the driving characteristics (inter-vehicle distance tendency) of the driver based on the accelerator-off operation, the estimation of the driving characteristics (inter-vehicle distance tendency) of the driver based on the brake depressing operation, the estimation of the driving characteristics (inter-vehicle distance tendency) of the driver based on the tendency of the average inter-vehicle time at following time, and the estimation of the driving characteristics (inter-vehicle distance tendency) of the driver based on the tendency of the average vehicle deceleration at the time of brake operation} has been carried out a predetermined number of times (for example, five times). The process goes to step ST8 for the estimations that have been carried out the predetermined number of times.

The driving characteristics estimating unit 1b calculates a moving average of the estimation results that have been estimated the predetermined number of times most recently (step ST8). Here, a result of the moving average is estimated as final driving characteristics of the driver (inter-vehicle distance tendency). The determination of the moving average and the determination of the driving characteristics (inter-vehicle distance tendency) according to a series of time series operations in vehicle operation as described above can make it possible to obtain the driving characteristics (inter-vehicle distance tendency) having a high accuracy even if feelings of drivers to the accelerator-off operation and the brake depressing operation do not agree with each other, respectively. At step ST8, the moving average is determined for every result of estimation such as the moving average based on the accelerator-off operation.

Note that, when the cruise control is being carried out (for example, an adaptive cruise control is being carried out), it may be determined that, for example, previously decided predetermined driving characteristics (inter-vehicle distance tendency) are used (step ST9).

As described above, since the driving characteristics estimating device and the drive assisting system of the modification can not only obtain an effect similar to the embodiment described above but also can estimate the driving characteristics (inter-vehicle distance tendency) of the driver based on the various conditions such as the accelerator-off operation, the driving characteristics (inter-vehicle distance tendency) having a higher accuracy of the driver can be found.

Figure 9:
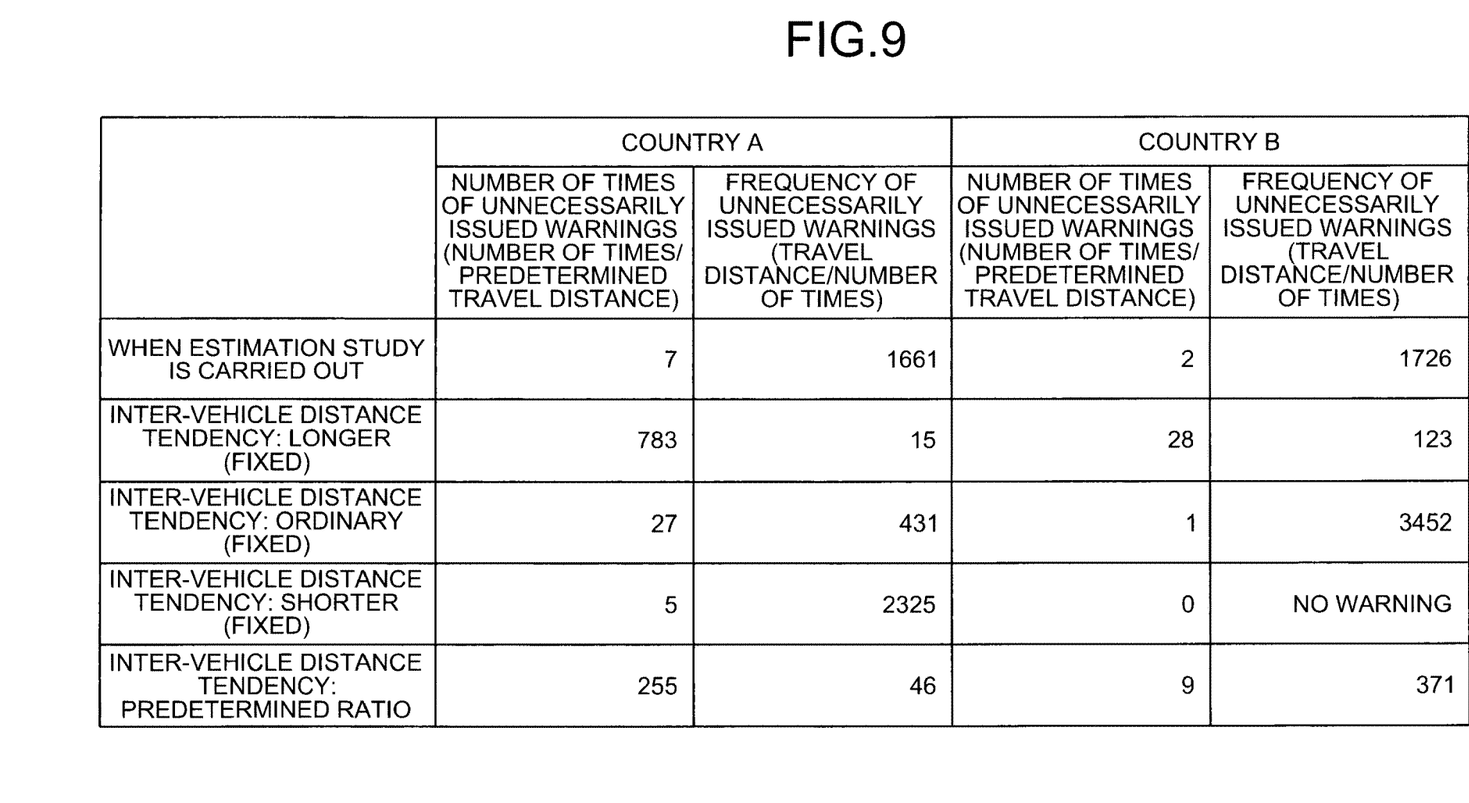
FIG. 9 is an example of a result of test.

A result of a test of issued state of an unnecessary warning issued by an experiment vehicle, to which the drive assisting system has applied, will be explained. FIG. 9 illustrates a result of the test.

In the test, the experiment vehicle was caused to travel a predetermined distance under a predetermined warning issue condition and the number of times of issue of warnings that had been felt unnecessary by a driver was examined. The warning issue condition includes not only a case that the estimation study of the embodiment and the modification was carried out and a warning was issued but also a case that setting of warning was fixed assuming that an inter-vehicle distance tendency corresponding to a conventional one (that is, the brake operation start time was earlier and the accelerator-off operation start time was earlier) and a warning had been issued earlier before the reference inter-vehicle distance was reached, a case that the setting of warning was fixed assuming that the inter-vehicle distance tendency was ordinary (that is, the brake operation start time was ordinary and the accelerator-off operation start time was ordinary) and a warning was issued when the reference inter-vehicle distance had been reached, and a case that the setting of warning was fixed assuming that the inter-vehicle distance tendency was short (that is, the brake operation start time was later and the accelerator-off operation start time was later) and a warning was issued later after the reference inter-vehicle distance had been reached. The test was carried out in a road environment (a travel distance: 11,625 km) in which, for example, a road tended to be crowded and which corresponded to a country A in which an average vehicle speed was low and in a road environment (a travel distance: 3,452 km) in a country B in which an average vehicle speed was higher than the country A.

According to the result of the test, it can be found that since a longer inter-vehicle distance tendency conventionally more increases the number of times unnecessary warnings were issued and the frequency of issue of the unnecessary warning becomes high, when a warning is issued before the reference inter-vehicle distance has been reached, there is a high possibility that the warning is felt unnecessary and troublesome. In contrast, it can be found that since the embodiment and the modification carry out the estimation study described above, the number of times unnecessary warnings are issued is reduced and an unnecessary warning issue frequency becomes low. The unnecessary warning issue frequency is obtained by dividing a predetermined travel distance (country A: 11,625 km, country B: 3,452 km) by the number of times the unnecessary warnings are issued.

Further, in the test, the case that a warning was issued earlier before the reference inter-vehicle distance had been reached assuming that the inter-vehicle distance tendency was long, the case that warning was issued when the reference inter-vehicle distance has been reached assuming that the inter-vehicle distance tendency was ordinary, and the case that warning was issued later after the reference inter-vehicle distance had been reached assuming that the inter-vehicle distance tendency was short were set to a predetermined ratio, and the number of times of issue of warnings that were felt unnecessary by the driver when a vehicle was caused to travel the predetermined travel distance (country A: 11,625 km, country B: 3,452 km) was also examined. It can be found that when the three inter-vehicle distance tendencies were set to a predetermined ratio (long: ordinary:early=30%: 58%:12%), the number of times unnecessary warnings were issued was large and the unnecessary warning issue frequency was high as compared with the embodiment and the modification.

Figure 10:
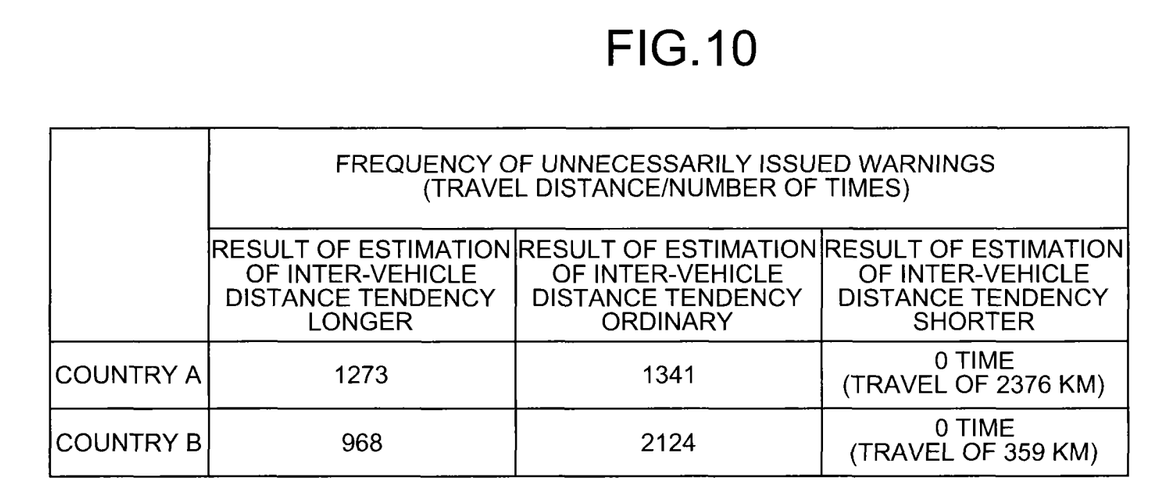
FIG. 10 is an example of the result of test.
Figure 31:
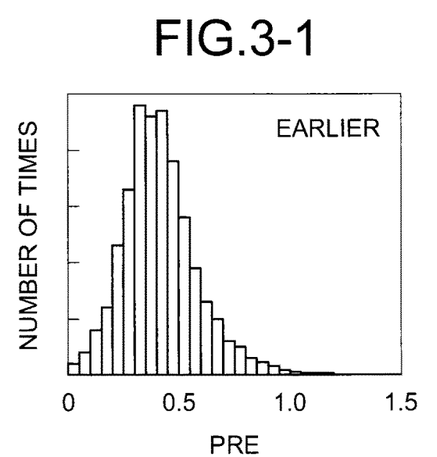
Figure 32:
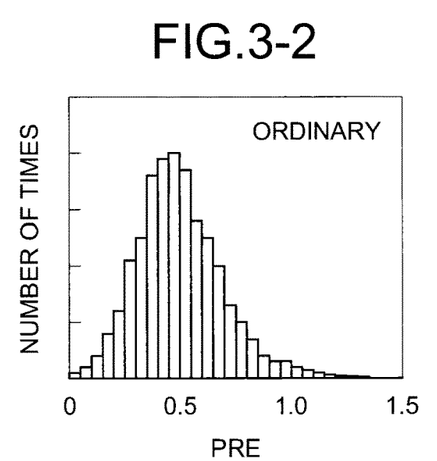
Figure 33:
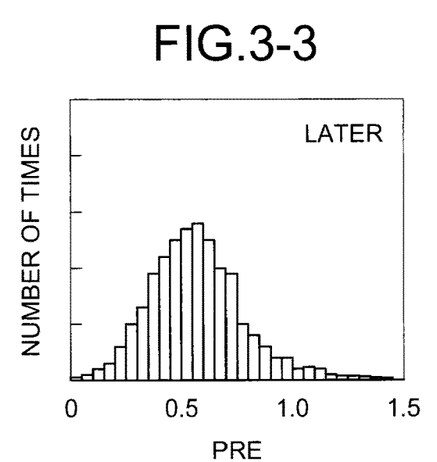

FIG. 10 is one of the results of the test and illustrates a warning issue frequency when it is estimated by the estimation study that the inter-vehicle distance tendency is long, the inter-vehicle distance tendency is ordinary, and the inter-vehicle distance tendency is short. According to FIG. 10, it can be found that, in the study result of estimation of the respective inter-vehicle distance tendencies, a warning is issued at approximately the same issue frequency without large deviation.

Incidentally, when the drive assisting is the vehicle lane departure warning control, the vehicle lane keeping assist control, and the staggering warning (rambling/drowsy drive warning) control described above, it is preferable to determine a degree of staggering of the driver (driving characteristics of driver) at the time of ordinary driving based on a white line lateral position, a yaw rate, a steering angular speed, steering torque and the standard deviations thereof, and to adjust a control intervention time of vehicle lane departure warning and the like. Further, when a curve vehicle speed warning control and a curve vehicle speed deceleration control are carried out, it is preferable to determine a tendency of turning characteristics (driving characteristics of driver) of the driver at the time of ordinary driving based on vehicle forward/backward acceleration, the vehicle lateral acceleration, the yaw rate, a brake depressing operation start position, and the standard deviation thereof while the vehicle turns or does not turn and to adjust a control intervention time of curve vehicle speed warning. Further, when a rambling/drowsy drive warning estimation control of the driver is carried out, it is preferable to determine a rambling/drowsy tendency (driving characteristics of the driver) of the driver based on the displacement of a center of gravity position and a head position and these standard deviation of the driver at the time of ordinary driving, to estimate whether or not the driver is in a rambling/drowsy driving state, and to alert the attention of the driver and to carry out deceleration control. Further, when a drive diagnose is carried out, it is preferable to determine a tendency of norm driving (safe driving) by the driver (driving characteristics of the driver) based on a temporary stop position (distance of a driver's own vehicle from a temporary stop line), the vehicle forward/backward acceleration, the vehicle lateral acceleration, a vehicle speed (difference to a limit speed of a travel path), and the standard deviations thereof.

Note that, the driving characteristics estimating device and the drive assisting system of the embodiment and the modification estimate characteristics of a person in consideration of a dispersion of the skills and the physical conditions of different persons and carry out the assist control according to the characteristics. Because of the reason, the technology according to the driving characteristics estimating device and the drive assisting system can be used to estimate, for example, the working characteristics and the motion characteristics of persons who carry out a job and a repeated motion on an assembly line in a factory and can be also used to adjust the work load and the motion load of persons according to a result of the estimation.

REFERENCE SIGNS LIST

1 VEHICLE ECU
1a OPERATION START INDEX VALUE CALCULATING UNIT
1b DRIVING CHARACTERISTICS ESTIMATING UNIT
1c PROBABILITY DENSITY FUNCTION CALCULATING UNIT
1d DRIVE ASSISTING CONTROLLER
2 VEHICLE SPEED DETECTOR
3 DISTANCE DETECTOR
4 BRAKE DEVICE
5 BRAKE OPERATION DETECTOR
6 WARNING DEVICE

The invention claimed is:

1. A driving characteristics estimating device comprising:
an operation start index value calculating unit configured to calculate one or more index values indicating respective start timings of a predetermined operation performed by a driver of a vehicle; and
a driving characteristics estimating unit configured to
refer to probability density functions obtained for each of a plurality of state groups that are determined based on the start timings of the predetermined operation, the probability density functions obtained by classifying the index values into the state groups and calculated based on the index values classified into the respective state groups,
obtain relationships between the probability density functions and respective index values,
calculate values on the probability density functions of the state groups, the values corresponding to one of the index values calculated by the operation start index value calculating unit,
calculate ratios of the values relative to a sum of the values,
weight the ratios, and
calculate a sum of the weighted ratios as an estimated value indicating driving characteristics of the driver.

2. The driving characteristics estimating device according to claim 1, further comprising a probability density function calculating unit configured to calculate the probability density functions.

3. The driving characteristics estimating device according to claim 1, wherein
the predetermined operation is a brake operation performed by the driver, and
the estimated value indicating driving characteristics of the driver is a value indicating a tendency of an inter-vehicle distance between the vehicle and a preceding vehicle.

4. The driving characteristics estimating device according to claim 2, wherein
the predetermined operation is a brake operation performed by the driver, and
the estimated value indicating driving characteristics of the driver is a value indicating a tendency of an inter-vehicle distance between the vehicle and a preceding vehicle.

5. The driving characteristics estimating device according to claim 1, wherein
the predetermined operation is an accelerator-off operation performed by the driver, and
the estimated value indicating driving characteristics of the driver is a value indicating a tendency of an inter-vehicle distance between the vehicle and a preceding vehicle.

6. The driving characteristics estimating device according to claim 2, wherein
the predetermined operation is an accelerator-off operation performed by the driver, and the estimated value indicating driving characteristics of the driver is a value indicating a tendency of an inter-vehicle distance between the vehicle and a preceding vehicle.

7. The driving characteristics estimating device according to claim 1, wherein
the predetermined operation includes a brake operation and an accelerator-off operation performed by the driver, and
the estimated value indicating driving characteristics of the driver is a value indicating a tendency of an inter-vehicle distance between the vehicle and a preceding vehicle.

8. The driving characteristics estimating device according to claim 2, wherein
the predetermined operation includes a brake operation and an accelerator-off operation performed by the driver, and
the estimated value indicating driving characteristics of the driver is a value indicating a tendency of an inter-vehicle distance between the vehicle and a preceding vehicle.

9. A drive assisting system comprising:
an operation start index value calculating unit configured to calculate one or more index values indicating respective start timings of a predetermined operation performed by a driver of a vehicle;
a driving characteristics estimating unit configured to
refer to probability density functions obtained for each of a plurality of state groups that are determined based on the start timings of the predetermined operation, the probability density functions obtained by classifying the index values into the state groups and calculated based on the index values classified into the respective state groups,
obtain relationships between the probability density functions and respective index values,
calculate values on the probability density functions of the state groups, the values corresponding to one of the index values calculated by the operation start index value calculating unit,
calculate ratios of the values relative to a sum of the values,
weight the ratios, and
calculate a sum of the weighted ratios as an estimated value indicating driving characteristics of the driver; and
a drive assisting controller configured to carry out a drive assisting according to the estimated value.

10. The drive assisting system according to claim 9, further comprising a probability density function calculating unit configured to calculate the probability density functions.

11. The drive assisting system according to claim 9, wherein
the predetermined operation is a brake operation performed by the driver, and
the estimated value indicating driving characteristics of the driver is a value indicating a tendency of an inter-vehicle distance between the vehicle and a preceding vehicle.

12. The drive assisting system according to claim 10, wherein
the predetermined operation is a brake operation performed by the driver, and
the estimated value indicating driving characteristics of the driver is a value indicating a tendency of an inter-vehicle distance between the vehicle and a preceding vehicle.

13. The drive assisting system according to claim 9, wherein
the predetermined operation is an accelerator-off operation performed by the driver, and
the estimated value indicating driving characteristics of the driver is a value indicating a tendency of an inter-vehicle distance between the vehicle and a preceding vehicle.

14. The drive assisting system according to claim 10, wherein
the predetermined operation is an accelerator-off operation performed by the driver, and
the estimated value indicating driving characteristics of the driver is a value indicating a tendency of an inter-vehicle distance between the vehicle and a preceding vehicle.

15. The drive assisting system according to claim 9, wherein
the predetermined operation includes a brake operation and an accelerator-off operation performed by the driver, and
the estimated value indicating driving characteristics of the driver is a value indicating a tendency of an inter-vehicle distance between the vehicle and a preceding vehicle.

16. The drive assisting system according to claim 10, wherein
the predetermined operation includes a brake operation and an accelerator-off operation performed by the driver, and
the estimated value indicating driving characteristics of the driver is a value indicating a tendency of an inter-vehicle distance between the vehicle and a preceding vehicle.

* * * * *